Feb. 11, 1958 — T. J. CRAWFORD — 2,823,294
SQUEEZE ROLL ASSEMBLY
Filed March 9, 1955 — 5 Sheets-Sheet 1

INVENTOR.
THOMAS J. CRAWFORD
BY
Oberlin & Limbach
ATTORNEYS

INVENTOR.
THOMAS J. CRAWFORD
BY
Oberlin & Limbach
ATTORNEYS

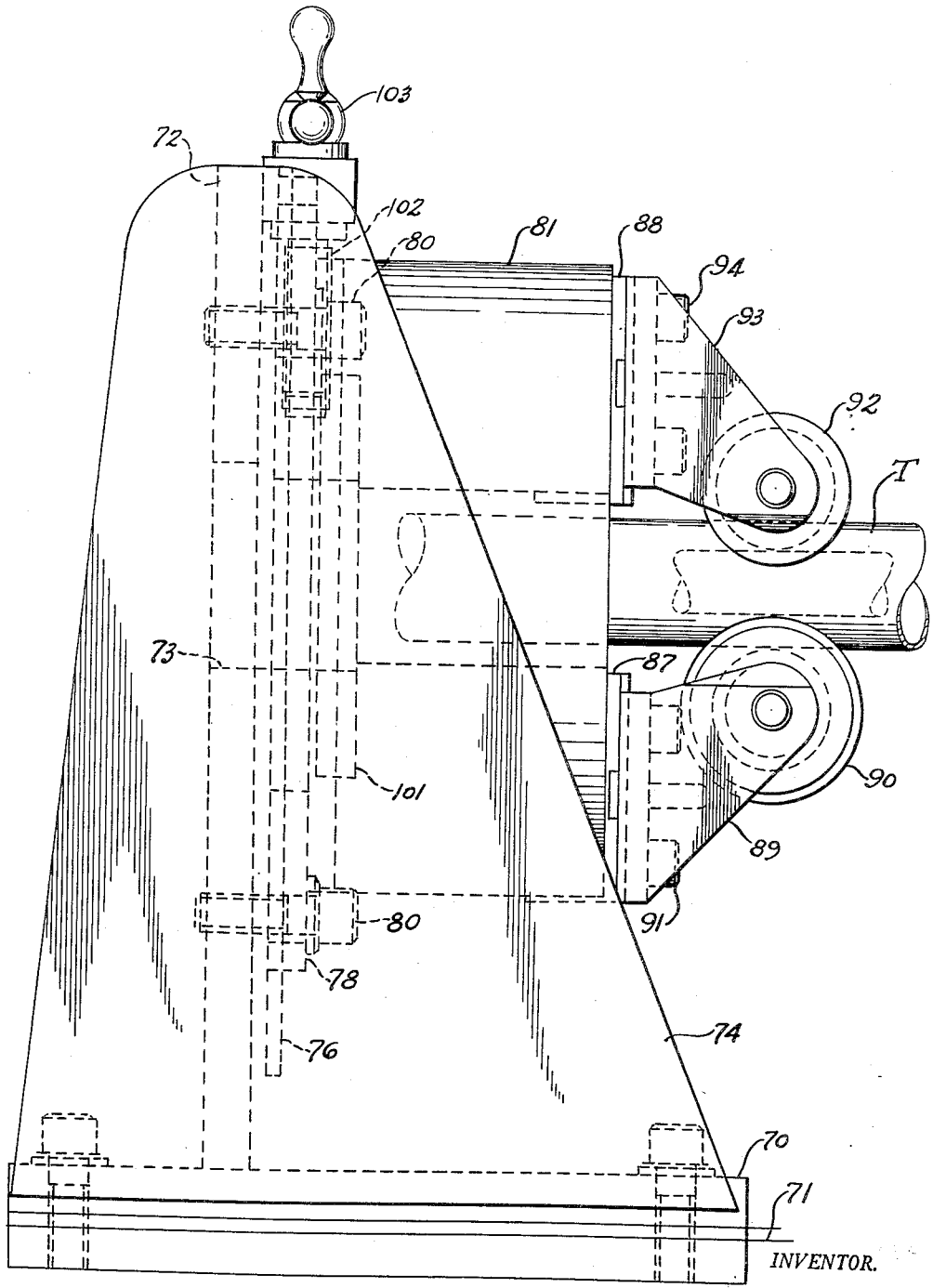

2,823,294

SQUEEZE ROLL ASSEMBLY

Thomas J. Crawford, Berkley, Mich.

Application March 9, 1955, Serial No. 493,267

14 Claims. (Cl. 219—59)

This invention relates to a squeeze roll assembly for use in tube-forming apparatus and, more particularly, to improvements in the squeeze roll structure disclosed in my Patent No. 2,687,464, dated August 24, 1954.

My noted earlier disclosure, in its entirety, is concerned with the production of induction welded tubing and describes tube mill apparatus incorporating both standard and improved units for the automatic and continuous formation of such tubing. Among the non-standard units is a squeeze roll assembly located and operative in relation to high-frequency inducing means to bring the opposed seam edges of a tubular blank, shaped from flat strip in the mill proper, into contact for welding. The method and complete apparatus for practice of the same may be ascertained by reference to the patent and, for purposes of the present disclosure, it is sufficient to consider only the construction and function of the squeeze roll unit.

Several considerations involved in the design of my prior unit are pertinent also to the instant improvements, due to the fact that the latter are likewise especially suited and primarily intended for use in such high-frequency induction welding apparatus. For example, while the squeeze rolls are substantially outside the field of the inductor, it is nevertheless generally desirable to form the rolls of a non-magnetic material as a positive assurance against overheating due to induced currents. Since the method is particularly adapted for the welding of thin-walled tubing, the rolls are such in number and size as substantially to contact the entire periphery of the tubing, the precise transverse contour of the rolls depending, of course, upon the size and shape of the tubing.

Due to the fact that my patented process acts, as explained in considerable detail in the patent, to concentrate the welding heat at the very point of welding, it is not generally necessary to exert heavy pressures on the squeeze rolls, as in the past, and this obviously facilitates employment of the rolls. Aluminum tubing and the like of thin walls may be welded without danger of crushing the same. The rolls should desirably be capable of convenient and accurate adjustment, the two factors being emphasized by virtue respectively of the high speeds of advance involved and the thinness of the work. It is a characteristic of my earlier squeeze roll assembly that the unit, preferably comprising three equally spaced rolls, is invertible from a position in which one roll is at the bottom of the blank to one in which this roll is uppermost and bears against the tubing in the region of the seam. This latter arrangement may be employed where the formation of an internal bead is not objectionable in view of the use to which the tubing is intended to be put, the uppermost roll forcing any bead formed inwardly and thereby obviating any subsequent trimming operation.

It is a principal object of the present invention to enhance the convenience of use and functioning of such a squeeze roll assembly by new construction, while preserving the noted basic characteristics thereof.

Another object of this invention is to provide a squeeze roll assembly embodying a plurality of rolls which may accurately be adjustably positioned by movement toward and away from the centerline of the unit with all the rolls moving together in any such adjustment and at equal velocity.

It is a further object of the present improvements to provide a squeeze roll assembly of such nature wherein the rolls may be individually positioned for adjustment of each relative to the others, in addition to the adjustment of all rolls simultaneously to maintain such relative arrangement.

An additional object is to improve my noted prior squeeze roll unit by facilitating rotation or inversion thereof about the centerline of the assembly, which is coincident with the axis of the tubing being welded, and hence relative to the tubing.

Other objects and advantages of the invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 4 is a side elevational view of a modified form of my new squeeze roll unit;

Figure 1:
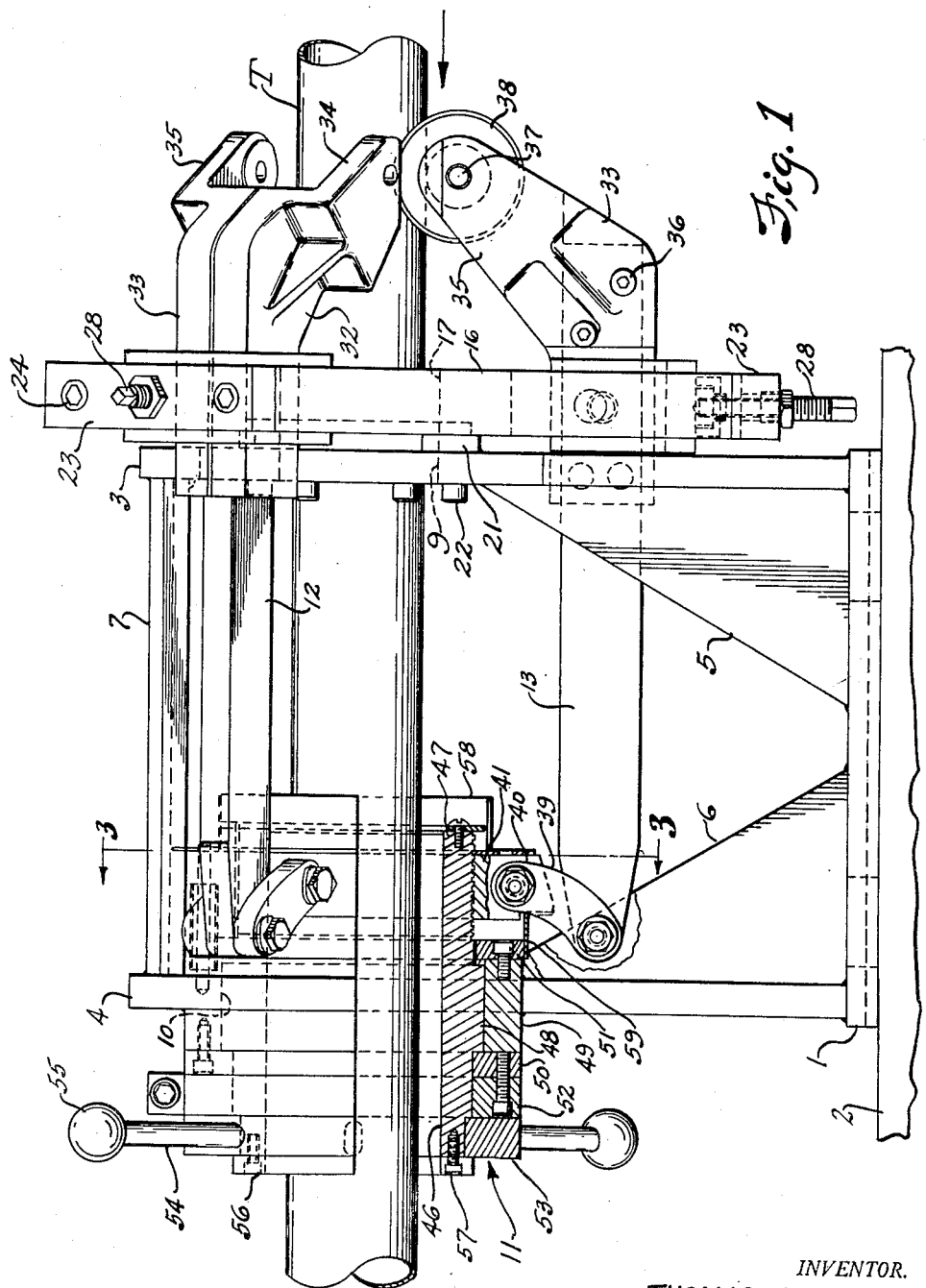
Fig. 1 is a side elevational view of a squeeze roll assembly in accordance with the present invention, a portion of the adjusting means to be described being shown in section to facilitate description and understanding thereof.

Referring now to the drawings in detail, and especially to Fig. 1, the assembly there shown comprises a base 1 which is in the form of a slide mounted for movement in ways 2 arranged for adjustment of the unit along the path of travel of the work. As indicated earlier, by reference to my noted patent, the assembly in its principal intended application would be employed with work in the form of tubing T, and the adjustment in ways 2 would be toward and away from the inducing means, the work moving in the direction indicated by the arrow.

Secured, for example by welding, in longitudinally spaced relation to the base or slide, are two parallel upstanding plates 3 and 4, which are braced in their lower portions by triangular side pieces 5 and 6 associated respectively therewith. The plates are rigidly interconnected in their upper portions by bars 7 and 8, so that this much of the structure forms a permanent and inflexible stand. The forward plate 3, that is, the plate first encountered by the tubing T in its advance through the assembly, is provided with a generally circular central aperture 9 for passage of the tubing therethrough in spaced relation, and the rear plate 4 has a similar, aligned, aperture 10.

Figure 2:
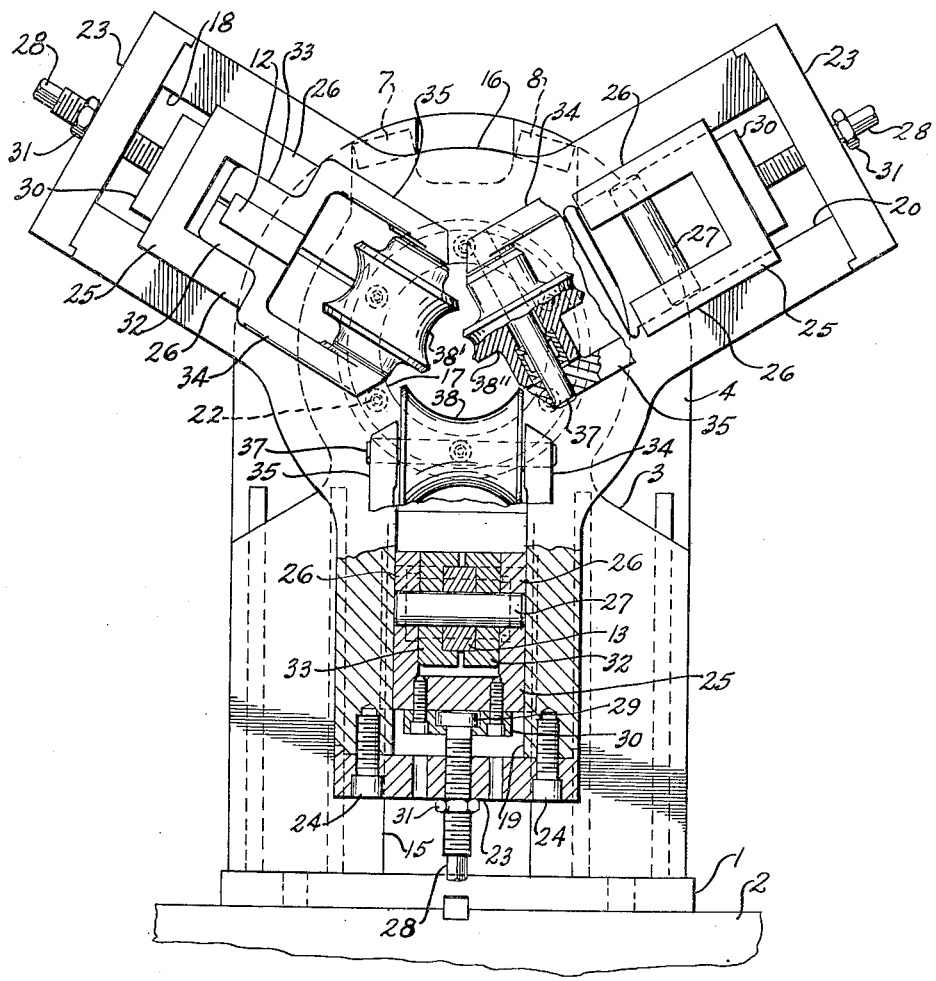
Fig. 2 is an end elevational view of this assembly as observed from the right in Fig. 1, the structure again being partially sectioned more clearly to illustrate its nature.
Figure 3:
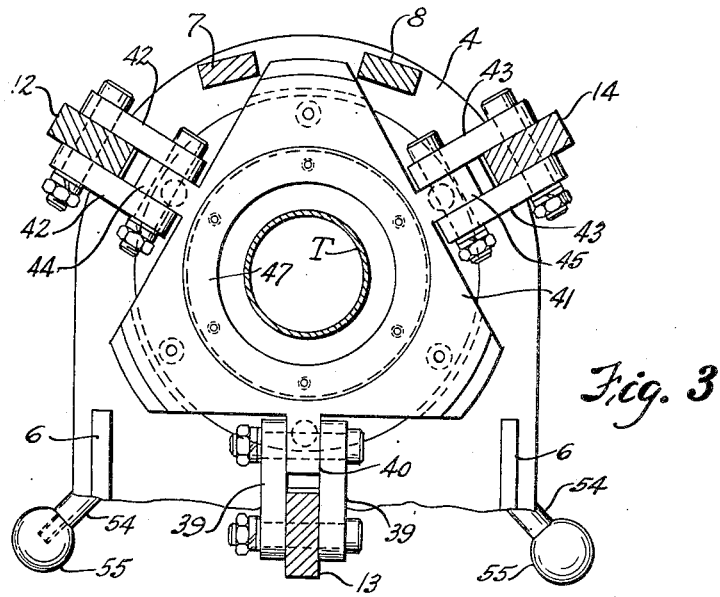
Fig. 3 is a sectional view taken on the line 3—3 in Fig. 1.

An arm support and adjusting mechanism, designated generally by reference numeral 11, is mounted in the opening 10 of the plate 4 with three arms 12, 13 and 14, the connection of the same with the mounting mechanism to be described below, projecting forwardly in equi-angularly spaced relation. The upper portion of plate 3 is generally circular, as illustrated most clearly in Fig. 2, and the lower portion is provided with a slot 15, the dimensions and arrangement of the thus formed plate being such that the two upper arms, arms 12 and 14, are spaced outwardly of the upper portion of the plate, while the lowermost arm 13 passes through the slot 15.

A Y-housing 16 having a central circular opening 17 and openings 18, 19 and 20 respectively in its three arms or branches is secured to the outer face of the plate 3, with its opening aligned with that of the plate. Mounting of this housing is accomplished by means of a spacer ring 21, welded to the plate 3 about the aperture thereof, and a series of screws 22 which pass from the rear of the plate through the ring and into the housing, the ring serving to space the housing slightly outwardly of the adjacent face of the plate. For a purpose to be described, six such screws are used arranged in circular equally spaced relation. The several openings 18, 19 and 20 of the Y-housing extend radially with respect to the centerline of the unit and the housing is disposed so that arms 12, 13 and 14 pass respectively through these openings.

Each such arm is similarly received within the associated opening of the Y-housing and supports a roll unit at its outer end. To illustrate the conformance of the rolls proper to the size of the tubing handled, three rolls of different size have been shown in Fig. 2. However, the roll mounting is the same in each case, as will be indicated by the use of like reference numerals, and therefore, only that associated with the arm 13 will be described in detail. The opening 19 through which this arm passes is actually formed by a radial slot in the particular branch of the Y-housing and a cap 23 removably attached by screws 24 to bridge the normally open outer end of the branch. Mounted for sliding movement along the opening is a pivot block 25 having grooved sides forming flanges engaged with opposite faces of the housing branch at the slot sides. The pivot block 25 is of U-shape and arranged with its legs 26 extending inwardly and supporting a transverse shaft 27.

Radial adjustment of the pivot block 25 is provided by an adjusting screw 28 threaded through the cap 23 and having an enlarged head 29 at its inner end which is held in a retainer 30 secured to the outer end of the block. It will be clear that the screw 28 is operative to advance or retract the pivot block, a jam nut 31 being provided to hold the screw in selected positions of adjustment, and that such individual positioning obtains in each of the three block assemblies.

Attached to the free end of arm 13 are left and right hand yokes 32 and 33, respectively, which have straight rearwardly extending portions disposed cooperatively to embrace an end portion of the arm, extending to the rear beyond plate 3, and angularly extending outer end portions 34 and 35, the latter being spaced outwardly of the bodies of the yokes and the two being disposed in parallel relation. The yokes are arranged so that these spaced end portions project forwardly and inwardly, and screws 36 are employed to join the yokes to one another and to the arm portion they embrace.

Yoke end portions 34 and 35 support a shaft 37 on which a roll 38 (the two other rolls have been designated 38' and 38") is mounted for rotation preferably on suitable bearings. Such roll is desirably made of non-magnetic material, for the reason mentioned earlier, and where one of the rolls is to be used directly over the welded seam, it should preferably be made of insulating and refractory material, such as bonded sapphire or vitreous alumina. The precise transverse contour of this, and all the rolls, is determined by the size and shape of the work, with the rolls being adapted to engage and bear against substantially the entire periphery of the tubing. From the foregoing, it will be seen that each roll may be moved in and out by rocking the associated arm about its pivotal connection with a pivot block in the Y-housing, and that additional adjustment may be had by individual positioning of the pivot blocks by means of the screws 28, each latter adjustment shifting the axis of the arm pivotal connection.

Returning now to the rear support for the several arms, arm 13 is connected by a pair of small arcuate links 39 to a projection 40 of a generally triangular shaped nut 41, and arms 12 and 14 are similarly connected by pairs of links 42 and 43 to further projections 44 and 45, respectively, of the nut. The connections of the links both to the nut and to the arms are all pivotal in nature so that movement of the nut along the path of the work causes the rolls simultaneously to move in and out at equal velocity. Such movement of the nut is provided and controlled by a pressure screw 46, which is likewise apertured for passage of the tubing T therethrough and extends through the plate 4 for engagement with the nut at its externally threaded inner end portion 47.

A shoulder portion 48 of the screw is rotatably held in a bearing sleeve 49 secured in the opening 10 of the plate 4, and retainers 50 and 51, attached to the respective ends of such sleeve, project inwardly into engagement with the shoulder portion 48 to hold the screw in place. A lock collar 52 is attached to the outer face of the retainer 50 and against the outer surface of the latter there is arranged an adjusting wheel 53 having spokes 54 terminating in knobs 55. A keeper ring 56 commonly overlies the outer end of the pressure screw 46 and the end face of wheel 53, and is secured to the former by screws 57. Shields 58 and 59 are secured to the respective ends of plane faces of the nut 41 for movement therewith and protection of the pressure screw threads, the shields extending forwardly and rearwardly of the nut.

The wheel 53 when turned thus causes the nut 41 to move axially in a direction depending upon the direction of wheel rotation, with the result that the three arms are moved together for simultaneous positioning of the rolls. It is to be noted that the operating members are so joined as to permit ready removal for convenient replacement purposes and also to accommodate the aforenoted desired inversion of the roll group, the arrangement normally being as illustrated with one roll in contact with the tubing opposite the welded seam. In this latter connection, the Y-housing 16 may be freed from the plate 3 by releasing the screws 22 and rotated or turned to inverted condition upon withdrawal of the arms. The arrangement of the screw fasteners permits securing of the Y-housing in both positions.

Figure 6:
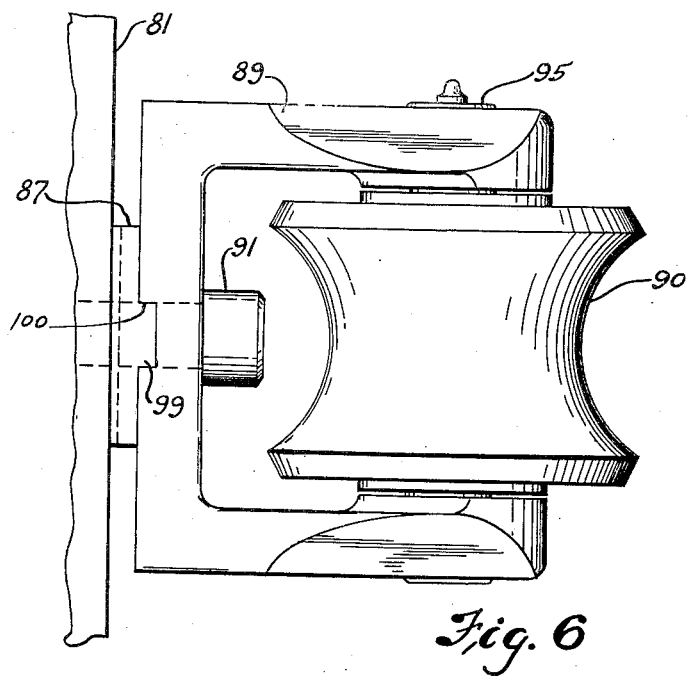
Fig. 6 is a fragmentary view illustrating in top plan one of the squeeze roll components of the structure shown in Fig. 4.
Figure 5:
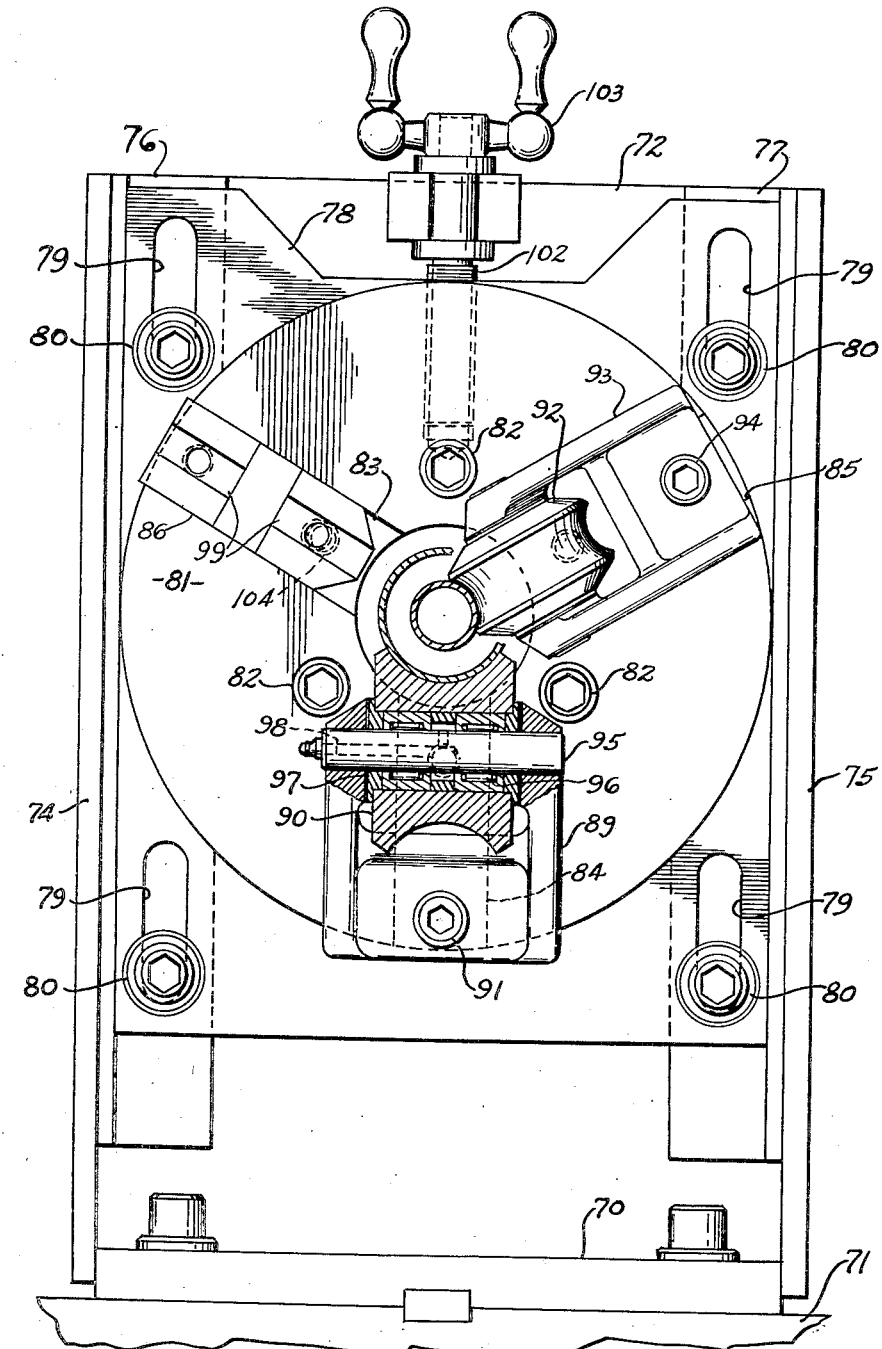
Fig. 5 is an end elevational view of the Fig. 4 structure, as viewed from the right.

In Figs. 4 to 6, I have illustrated a modified construction likewise characterized by ease of adjustment and inversion as described. This structure comprises a base 70, slideably mounted on ways 71 and supporting an upstanding frame member 72. Such frame member is provided with a circular central aperture 73 for passage of the tubing T therethrough and is braced by side pieces 74 and 75 secured thereto and to the base. Structural angles 76 and 77 are secured in the respective corners formed by the front face of the frame member and the side pieces 74 and 75 and disposed thereagainst is an adjusting plate 78. The plate 78 is spaced by the angles from the frame member and mounted for limited vertical movement guided by the angles.

For such purposes of adjustment, the plate 78 is provided with four vertical slots 79 in the respective corners of the same and locking screw assemblies 80 extend through the plate slots, the angles, and into the frame member 72, with the outer end portions of the same overlying the outer surface of the plate. The plate may accordingly be moved vertically by loosening of the screw assemblies and secured in selected positions of adjustment by tightening of these assemblies.

A combination geared scroll chuck 81 of suitable commercially available type, such as supplied by The Skinner Chuck Company of New Britain, Connecticut, is attached to the adjusting plate 78 to project horizontally therefrom and surround the path of work travel. The chuck body is thus attached by means of screws 82 extending longitudinally through the same from the front face of the body into the plate.

The outer end face of the chuck is conventionally formed with three equally spaced radial slots 83, 84 and 85 within which blocks 86, 87 and 88 are respectively mounted for drive by the scroll, not shown, of the chuck in well-known manner, the blocks being movable in and out simultaneously and to equal extents upon actuation of the scroll. Each block may also be individually positioned radially relative to the scroll as in the usual chuck construction and here is employed removably to mount a roll and support bracket therefor. However, for a more readily apparent understanding of the structure and its flexibility, I have shown only two rolls, mounted on the blocks 87 and 88, and these are of different size. To facilitate comparison of the rolls, the one mounted on the block 88 has in Fig. 4 been rotated with this block 60° counter-clockwise from its normal position shown in the front elevation of Fig. 5.

Thus, a bracket 89 supporting a roll 90 is mounted on the block 87 by means of screws 91 and block 88 has a roll 92 and bracket 93 similarly attached thereto by screws 94. The two rolls, being of different size, have different transverse contours designed for contact approximately with one-third of the periphery of the particular tubing with which they are used. The earlier-mentioned considerations with regard to the material of which the rolls are made apply here as well.

The support of each roll comprises a shaft 95, needle bearings 96, and end thrust bearings 97. Such shaft is provided with a passage indicated at 98 for the supply of a lubricant to the interior of the assembly. It will also be noted that the blocks are formed with radial bosses 99 which are received within corresponding grooves 100 formed in the bracket bases for accurate and uniform mounting of the brackets.

Actuation of the scroll is conveniently accomplished by means of a ring gear 101 having a connection therewith and in mesh with a vertical adjusting screw 102. The latter is equipped with a compound rest 103 and it will be clear that manipulation of the rest controls movement of the blocks and hence adjustment of the rolls. As indicated, the chuck body is normally attached as illustrated in Fig. 5, so that one roll engages the tubing opposite the welded seam. This assembly is, however, also rotatable for positioning of one roll directly over the seam and, to this end, the adjusting plate 78 is provided with a further series of three threaded holes indicated at 104 at the same radius and spacing as the holes within which the screws 82 are shown engaged. Accordingly, such rotative adjustment may very easily be effected by retraction of the screws, indexing the chuck body to align the screws with the second series of plate holes, and then again tightening the screws.

Both forms of the invention are, therefore, characterized by multiple adjustments of such nature as to improve the convenience of use and efficiency of the same. The simultaneous adjustment of the rolls provided affords obvious advantages, especially in the handling of thin-walled and hence easily deformed work, proper centering being maintained in any such adjustment. Both forms of my new squeeze roll assembly are furthermore adapted for quick and convenient conversion in the handling of tubes of different sizes and shapes, the rolls in each case being readily dismountable for necessary substitution.

Other modes of applying the principle of the invention may be employed, change being made as regards the details described, provided the features stated in any of the following claims, or the equivalent of such, be employed.

I therefore particularly point out and distinctly claim as my invention:

1. A squeeze roll assembly for use in induction tube-welding apparatus, comprising a plurality of non-magnetic rolls so constructed and arranged as collectively to engage and bear against substantially the entire periphery of the work, a support for each roll extending therefrom outwardly and then in the direction of advance of the work through the assembly, a base adapted to be moved adjustably parallel to the path of work travel, means mounting the several supports and associated rolls on said base for movement as a unit therewith, a portion of such mounting means being rotatably supported for variably orienting the rolls and supports therefor rotatively with respect to the centerline of the assembly, adjusting means for individually radially positioning the rolls, and common adjusting means operative upon actuation to cause all rolls to move radially simultaneously and to equal extent.

2. A squeeze roll assembly comprising a plurality of rolls so constructed and arranged as collectively to engage and bear against substantially the entire periphery of the work, support means for the respective rolls extending therefrom outwardly and then in the direction of advance of the work through the assembly, means mounting said support means for movement along the path of work travel, a portion of such mounting means being rotatable about the centerline of the assembly for rotative adjustment of the rolls, and common adjusting means operative upon actuation to move all rolls simultaneously radially to an equal extent.

3. A squeeze roll assembly for use in induction tube-welding apparatus, comprising a base adapted adjustably to be moved substantially parallel to the path of travel of the work, first and second stands secured in spaced relation to said base and having aligned openings for passage of the work therethrough, a housing provided with a generally central aperture and three radial slots separate from and disposed substantially equidistantly about such aperture, attaching means releasably securing said housing to the outer face of the first stand with the housing aperture aligned with the stand opening, a pivot block slidably mounted in each such slot of the housing, adjusting means for individually positioning such pivot blocks radially in the slots, three arms disposed to extend respectively through the slots with each pivotally secured to the pivot block in the associated slot for swinging movement radially inwardly of the housing aperture, non-magnetic squeeze rolls mounted on the outer ends of said arms beyond the housing, an apertured screw member disposed for rotation and retained in the opening of the second stand, a nut engaged on said screw member adapted to be moved by turning thereof along the path of work travel, and pivotal link connections between the inner ends of said arms and the nut for causing movement of the latter to swing the arms as aforesaid about their connections with the pivot blocks, the screw member thereby being operative to adjust the three rolls simultaneously with all rolls moving the same extent in any such adjustment, said housing being adapted to be secured in plural positions to said first stand variably to locate the arms and rolls about the work.

4. A squeeze roll assembly for use in induction tube-welding apparatus, comprising a base adapted adjustably to be moved substantially parallel to the path of travel of the work, first and second stands secured in spaced relation to said base and having aligned openings for passage of the work therethrough, a housing provided with a generally central aperture and three radial slots separate from and disposed substantially equidistantly about such aperture, attaching means securing said housing to the first stand with the housing aperture aligned with the stand opening, a pivot block slidably mounted in each such slot of the housing, adjusting means for individually positioning such pivot blocks radially in the slots, three arms disposed to extend respectively through the slots with each pivotally secured to the pivot block in the associated slot for swinging movement radially inwardly of the housing aperture, non-magnetic squeeze rolls mounted on the outer ends of said arms beyond the housing, an apertured screw member disposed for rotation and retained in the opening of the second stand, a nut engaged on said screw member adapted to be moved by turning thereof along the path of work travel, and pivotal link connections between the inner ends of said arms and the nut for causing movement of the latter to swing the arms as aforesaid about their connections with the pivot blocks, the screw member thereby being operative to adjust the three rolls simultaneously with all rolls moving the same extent in any such adjustment.

5. A squeeze roll assembly comprising a base adapted adjustably to be moved substantially parallel to the path of travel of the work, first and second stands secured in spaced relation to said base and having aligned openings for passage of the work therethrough, a housing provided with a generally central aperture and three radial slots separate from and disposed substantially equidistantly about such aperture, attaching means securing said housing to the first stand with the housing aperture aligned with the stand opening, a pivot block slidably mounted in each such slot of the housing, adjusting means for individually positioning such pivot blocks radially in the slots, three arms disposed to extend respectively through the slots with each pivotally secured to the pivot block in the associated slot for swinging movement radially inwardly of the housing aperture, squeeze rolls mounted on the outer ends of said arms beyond the housing, an apertured screw member disposed for rotation and retained in the opening of the second stand, a nut engaged on said screw member adapted to be moved by turning thereof along the path of work travel, and pivotal link connections between the inner ends of said arms and the nut for causing movement of the latter to swing the arms as aforesaid about their connections with the pivot blocks, the screw member thereby being operative to adjust the three rolls simultaneously with all rolls moving the same extent in any such adjustment.

6. A squeeze roll assembly comprising a base adapted adjustably to be moved substantially parallel to the path of travel of the work, first and second stands secured in spaced relation to said base and having aligned openings for passage of the work therethrough, a housing provided with a generally central aperture and a plurality of radial slots disposed substantially equidistantly about such aperture, attaching means securing said housing to the first stand with the housing aperture aligned with the stand opening, a pivot block slidably mounted in each such slot of the housing, adjusting means for individually positioning such pivot blocks radially in the slots, plural arms disposed to extend respectively through the slots with each pivotally secured to the pivot block in the associated slot for swinging movement radially inwardly of the housing aperture, squeeze rolls mounted on the outer ends of said arms beyond the housing, an apertured screw member disposed for rotation and retained in the opening of the second stand, a nut engaged on said screw member adapted to be moved by turning thereof along the path of work travel, and pivotal link connections between the inner ends of said arms and the nut for causing movement of the latter to swing the arms as aforesaid about their connections with the pivot blocks, the screw member thereby being operative adjustably to move the rolls simultaneously and to the same extent.

7. A squeeze roll assembly comprising a base, first and second stands secured in spaced relation to said base and having aligned openings for passage of the work therethrough, a housing provided with a generally central aperture and a plurality of radial slots disposed substantially equidistantly about such aperture, attaching means securing said housing to the first stand with the housing aperture aligned with the stand opening, a pivot block slidably mounted in each such slot of the housing, plural arms disposed to extend respectively through the slots with each pivotally secured to the pivot block in the associated slot for swinging movement radially inwardly of the housing aperture, squeeze rolls mounted on the outer ends of said arms beyond the housing, screw adjusting means supported by the second stand including a nut adapted to move along the path of work travel, and pivotal link connections between the inner ends of said arms and the nut for causing movement of the latter to swing the arms as aforesaid about their connections with the pivot blocks, the screw adjusting means thereby being operative adjustably to move the rolls simultaneously and to the same extent.

8. A squeeze roll assembly comprising a base, two spaced supports carried by said base, a plurality of circularly spaced-apart arms disposed to extend from adjacent one support to a point beyond the other support, attaching means pivotally securing said arms to such other support for radial swinging movement, squeeze rolls mounted on the outer ends of said arms, and roll-positioning means connected to the inner ends of said arms, said positioning means being mounted by such one support and operative thus to swing the arms simultaneously and to the same extent in each actuation thereof.

9. A squeeze roll assembly comprising a base, an apertured stand secured to said base, a hollow cylindrical body attached to said stand with its bore aligned with the stand aperture, said body being provided with plural radial ways and mounting slides disposed respectively therein, squeeze rolls mounted on said slides, the attachment of the body to the stand providing rotation of the former about its longitudinal axis and locking of the body in selected positions of rotative adjustment, whereby the squeeze rolls may be variably positioned about work passing through the body, and common adjusting means operative simultaneously and equally to advance and retract the slides and hence the rolls.

10. A squeeze roll assembly comprising a base, a stand secured to said base, an adjusting plate mounted for limited vertical movement against said stand, the stand and adjusting plate being apertured for passage of work therethrough, a hollow cylindrical body attached to said plate with its bore aligned with the aperture thereof, said body being formed with plural radial ways and provided with mounting slides disposed respectively therein, squeeze rolls mounted on said slides, the attachment of the body to said adjusting plate providing rotation of the former about its longitudinal axis and locking of the body in selected positions of rotative adjustment, whereby the squeeze rolls may be variably positioned about the work, and common adjusting means operative simultaneously and equally to advance and retract the slides and hence the rolls.

11. A squeeze roll assembly for use in induction tube-welding apparatus, comprising a base, a stand secured to said base, an adjusting plate mounted for limited vertical movement against said stand, the stand and adjusting plate being apertured for passage of work therethrough, a hollow cylindrical body attached to said plate with its bore aligned with the aperture thereof, said body being formed with plural radial ways and provided with mounting slides disposed respectively therein, non-magnetic squeeze rolls mounted on said slides, the attachment of the body to said adjusting plate providing rotation of the former about its longitudinal axis and locking of the body in selected positions of rotative adjustment, whereby the squeeze rolls may be variably positioned about the work, and common adjusting means operative simultaneously and equally to advance and retract the slides and hence the rolls.

12. A squeeze roll assembly for use in induction tube-welding apparatus, comprising a base, a stand secured to said base, an adjusting plate mounted for limited vertical movement against said stand, the stand and adjusting plate being apertured for passage of work therethrough, a hollow cylindrical body attached to said plate with its bore aligned with the aperture thereof, the outer end face of said body being formed with plural radial ways, a slide block disposed in each such way, non-magnetic squeeze rolls mounted on such blocks, the attachment of the body to said adjusting plate providing rotation of the former about its longitudinal axis and locking of the body in selected positions of rotative adjustment, whereby the squeeze rolls may be variably positioned about the work, and single adjusting means operative in each actuation thereof simultaneously and equally to move the slide blocks and therefore the rolls radially.

13. A squeeze roll assembly for use in induction tube-welding apparatus, comprising a base, a stand secured to said base, an adjusting plate mounted for limited vertical movement against said stand, the stand and adjusting plate being apertured for passage of work therethrough, a hollow cylindrical body attached to said plate with its bore aligned with the aperture thereof, the outer end face of said body being formed with plural radial ways, a slide block disposed in each such way, bracket members secured to such blocks and projecting forwardly and inwardly thereof, non-magnetic squeeze rolls mounted by said bracket members, the attachment of the body to said adjusting plate providing rotation of the former about its longitudinal axis and locking of the body in selected positions of rotative adjustment, whereby the squeeze rolls may be variably positioned about the work, and single adjusting means operative in each actuation thereof simultaneously and equally to move the slide blocks and therefore the rolls radially.

14. A squeeze roll assembly for use in induction tube-welding apparatus, comprising a base, a stand secured to said base, an adjusting plate mounted for limited vertical movement against said stand, the stand and adjusting plate being apertured for passage of work therethrough, a hollow cylindrical body attached to said plate with its bore aligned with the aperture thereof, the outer end face of said body being formed with three radial ways arranged substantially equidistantly about the bore of the body, a slide block disposed in each such way, bracket members secured to such blocks and projecting forwardly and inwardly thereof, non-magnetic squeeze rolls mounted by said bracket members, the attachment of the body to said adjusting plate providing rotation of the former about its longitudinal axis and locking of the body in selected positions of rotative adjustment, whereby the squeeze rolls may be variably positioned about the work, and single adjusting means operative in each actuation thereof simultaneously and equally to move the slide blocks and therefore the rolls radially.

References Cited in the file of this patent

UNITED STATES PATENTS

| | | |
|---|---|---|
| 747,841 | Baehr | Dec. 22, 1903 |
| 1,122,665 | Thomson | Dec. 29, 1914 |
| 1,997,272 | Adams | Apr. 9, 1935 |
| 1,999,805 | Dyer | Apr. 30, 1935 |
| 2,687,464 | Crawford | Aug. 24, 1954 |